United States Patent
Maruyama et al.

(10) Patent No.: US 12,049,538 B2
(45) Date of Patent: Jul. 30, 2024

(54) EPOXY RESIN, EPOXY RESIN COMPOSITION, EPOXY RESIN CURED PRODUCT AND COMPOSITE MATERIAL

(71) Applicant: SHOWA DENKO MATERIALS CO., LTD., Tokyo (JP)

(72) Inventors: Naoki Maruyama, Tokyo (JP); Tomoko Higashiuchi, Tokyo (JP); Kazumasa Fukuda, Tokyo (JP); Hideyuki Katagi, Tokyo (JP); Yuki Nakamura, Tokyo (JP); Yoshitaka Takezawa, Tokyo (JP)

(73) Assignee: SHOWA DENKO MATERIALS CO., LTD., Tokyo (JP)

( * ) Notice: Subject to any disclaimer, the term of this patent is extended or adjusted under 35 U.S.C. 154(b) by 698 days.

(21) Appl. No.: 17/274,762

(22) PCT Filed: Sep. 10, 2018

(86) PCT No.: PCT/JP2018/033478
§ 371 (c)(1),
(2) Date: Mar. 9, 2021

(87) PCT Pub. No.: WO2020/053937
PCT Pub. Date: Mar. 19, 2020

(65) Prior Publication Data
US 2022/0049046 A1 Feb. 17, 2022

(51) Int. Cl.
*C08G 59/24* (2006.01)
*C08G 59/50* (2006.01)
*C08G 59/56* (2006.01)
*C08G 59/62* (2006.01)
*C08G 59/68* (2006.01)
*C08J 5/04* (2006.01)

(52) U.S. Cl.
CPC ......... *C08G 59/245* (2013.01); *C08G 59/504* (2013.01); *C08G 59/56* (2013.01); *C08G 59/621* (2013.01); *C08G 59/688* (2013.01); *C08J 5/042* (2013.01); *C08J 2363/02* (2013.01)

(58) Field of Classification Search
CPC .... C08G 59/245; C08G 59/504; C08G 59/56; C08G 59/621; C08G 59/688; C08J 5/042; C08J 2363/02
USPC ......................................... 524/611
See application file for complete search history.

(56) References Cited

U.S. PATENT DOCUMENTS

2019/0225794 A1    7/2019    Fukuda et al.

FOREIGN PATENT DOCUMENTS

| JP | 2017-505844 A | 2/2017 | |
|---|---|---|---|
| JP | 2017-82213 A | 5/2017 | |
| JP | 2018-162451 A | 10/2018 | |
| WO | 2017/221810 A1 | 12/2017 | |
| WO | 2018/070051 A1 | 4/2018 | |
| WO | 2018/070052 A1 | 4/2018 | |
| WO | 2018/070053 A1 | 4/2018 | |
| WO | 2018/070534 A1 | 4/2018 | |
| WO | 2018/070535 A1 | 4/2018 | |
| WO | WO-2018070051 A1 * | 4/2018 | ........... C08G 59/066 |
| WO | WO-2018070052 A1 * | 4/2018 | ............ C08G 59/20 |
| WO | 2018/168556 A1 | 9/2018 | |

* cited by examiner

*Primary Examiner* — Ling Siu Cho
*Assistant Examiner* — Ronald Grinsted
(74) *Attorney, Agent, or Firm* — SOLARIS Intellectual Property Group, PLLC

(57) ABSTRACT

An epoxy resin includes an epoxy compound having a mesogenic structure, a cured product of the epoxy resin having a flexural modulus of 3.0 GPa or more at 23° C., a fracture toughness of 1.0 MPa·m$^{1/2}$ or more, and a glass transition temperature of 150° C. or higher.

12 Claims, No Drawings

EPOXY RESIN, EPOXY RESIN COMPOSITION, EPOXY RESIN CURED PRODUCT AND COMPOSITE MATERIAL

TECHNICAL FIELD

The present disclosure relates to an epoxy resin, an epoxy resin composition, an epoxy resin cured product and a composite material.

BACKGROUND ART

Epoxy resin is used in various applications owing to its high thermal resistance, and fiber-reinforced composite materials using epoxy resin have recently been increasingly applied to structural materials. Fiber-reinforced composite materials are used for structural frameworks of airplanes and the like, and therefore, are required to have excellent thermal resistance and strength. Various efforts are being made on epoxy resin as a resin material of fiber-reinforced composite materials since epoxy resin can form a cross-linked structure thereby exhibiting excellent thermal resistance and strength (for example, see Patent Documents 1 and 2).

RELATED ART DOCUMENTS

Patent Documents

[Patent Document 1] Japanese Patent Application Laid-Open (JP-A) No. 2017-82213
[Patent Document 2] JP-A No. 2017-505844

SUMMARY OF INVENTION

Technical Problem

In a case in which epoxy resin is applied to a fiber-reinforced composite material of airplanes or the like, a method involving, for example, providing a resin layer in which thermoplastic resin particles such as polyamide are dispersed at a surface area of an epoxy resin prepreg, and the produced layers are disposed on one another, has conventionally been adopted. While this method allows for improving fracture toughness in the compression direction, the method involves a complicated manufacturing process since the particles of a thermoplastic resin need to be localized at the surface area of a prepreg.

In view of these circumstances, the present disclosure is directed to providing an epoxy resin that can simplify the production process of a fiber-reinforced composite material, and an epoxy resin composition, an epoxy resin cured product and a composite material that employ the epoxy resin.

Solution to Problem

Means for solving the above-described problems include the following embodiments.
  [1] An epoxy resin, including an epoxy compound having a mesogenic structure, a cured product of the epoxy resin having a flexural modulus of 3.0 GPa or more at 23° C., a fracture toughness of 1.0 MPa·m$^{1/2}$ or more, and a glass transition temperature of 150° C. or higher.
  [2] The epoxy resin according to [1], wherein the mesogenic structure includes a mesogenic structure represented by the following General Formula (1).

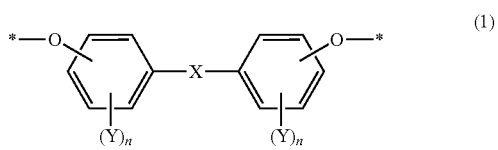

In General Formula (1), X represents a single bond or a linking group that includes at least one divalent group selected from the following Group (A); each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; and * represents a bonding site to an adjacent atom.

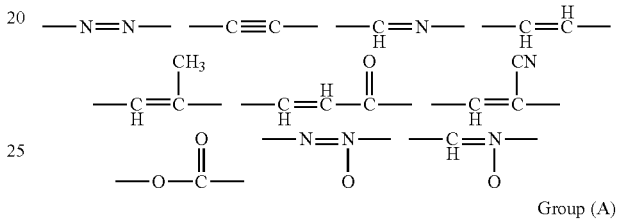

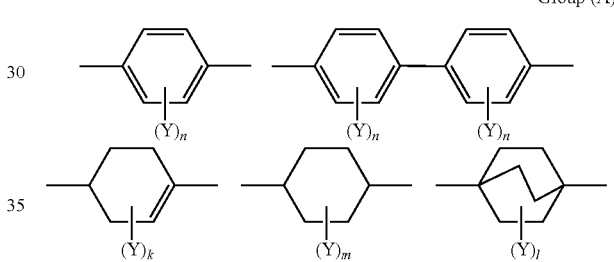

Group (A)

In Group (A), each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; k represents an integer from 0 to 7; m represents an integer from 0 to 8; and l represents an integer from 0 to 12.
  [3] The epoxy resin according to [2], wherein the structure represented by General Formula (1) includes a structure represented by the following General Formula (2).

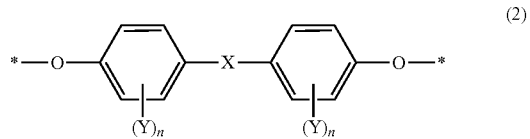

In General Formula (2), X represents a single bond or a linking group that includes at least one divalent group selected from Group (A); each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; and * represents a bonding site to an adjacent atom.

[4] The epoxy resin according to [2], wherein the epoxy compound having a mesogenic structure includes at least one structure selected from the group consisting of the following General Formula (1-A), General Formula (1-B), and General Formula (1-C).

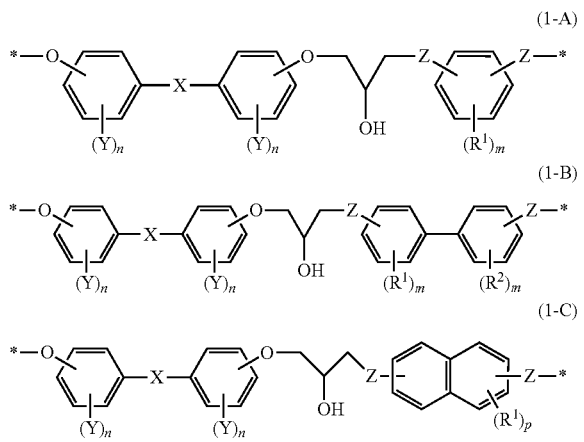

In General Formula (1-A), General Formula (1-B), and General Formula (1-C), X represents a single bond or a linking group that includes at least one divalent group selected from Group (A); each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; each m independently represents an integer from 0 to 4; p represents an integer from 0 to 6; each Z independently represents —O— or —NH—; each of $R^1$ and $R^2$ independently represents an alkyl group having 1 to 8 carbon atoms; and * represents a bonding site to an adjacent atom.

[5] The epoxy resin according to any one of [2] to [4], wherein the epoxy compound having a mesogenic structure includes at least one structure selected from the group consisting of the following General Formula (2-A), General Formula (2-B), and General Formula (2-C).

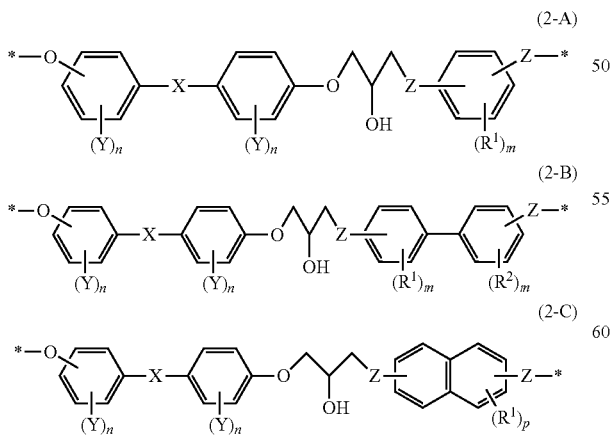

In General Formula (2-A), General Formula (2-B), and General Formula (2-C), X represents a single bond or a linking group that includes at least one divalent group selected from Group (A); each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; each m independently represents an integer from 0 to 4; p represents an integer from 0 to 6; each Z independently represents —O— or —NH—; each of $R^1$ and $R^2$ independently represents an alkyl group having 1 to 8 carbon atoms; and * represents a bonding site to an adjacent atom.

[6] The epoxy resin according to [3], wherein the structure represented by General Formula (2) includes at least one structure selected from the group consisting of the following General Formula (3) and General Formula (4).

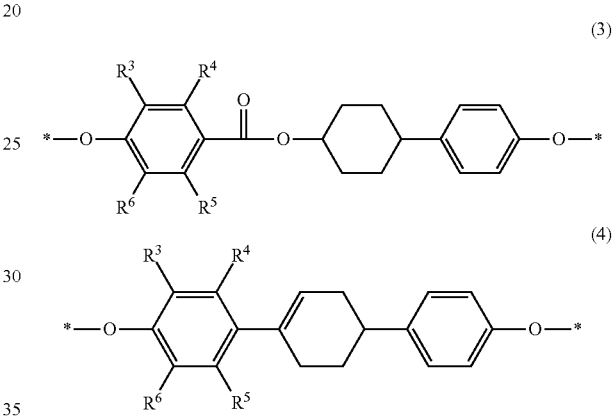

In General Formula (3) and (4), each of $R^3$ to $R^6$ independently represents a hydrogen atom or an alkyl group having 1 to 3 carbon atoms; and * represents a bonding site to an adjacent atom.

[7] An epoxy resin composition, including the epoxy resin according to any one of claims [1] to [6] and a curing agent.

[8] The epoxy resin composition according to [7], wherein the curing agent includes a compound having two or more amino groups that are directly bonded to an aromatic ring.

[9] The epoxy resin composition according to [7] or [8], wherein the curing agent includes 3,3'-diaminodiphenyl sulfone.

[10] An epoxy resin cured product, including a cured product of the epoxy resin composition according to any one of claims [7] to [9].

[11] A composite material, including the epoxy resin cured product according to [10] and a reinforcing material.

[12] The composite material according to [11], wherein the reinforcing material includes a carbon material.

Advantageous Effects of Invention

According to the present disclosure, an epoxy resin that can simplify the production process of a fiber-reinforced composite material, and an epoxy resin composition, an epoxy resin cured product and a composite material that employ the epoxy resin are provided.

DESCRIPTION OF EMBODIMENTS

Embodiments for carrying out the invention will be described below in detail. However, the invention is not limited to the following embodiments. In the following embodiments, components (including elemental steps, etc.) thereof are not essential unless otherwise specified. The same applies to numerical values and ranges, which do not limit the invention.

In the present disclosure, the term "step" encompasses an independent step separated from other steps as well as a step that is not clearly separated from other steps, as long as a purpose of the step can be achieved.

In the present disclosure, a numerical range specified using "(from) . . . to . . . " represents a range including the numerical values noted before and after "to" as a minimum value and a maximum value, respectively.

In the numerical ranges described in a stepwise manner in the present disclosure, the upper limit value or the lower limit value described in one numerical range may be replaced with the upper limit value or the lower limit value of another numerical range described in a stepwise manner. Further, in the numerical ranges described in the present disclosure, the upper limit value or the lower limit value of the numerical ranges may be replaced with the values shown in the Examples.

In the present disclosure, each component may include plural substances corresponding to the component. In a case in which plural substances corresponding to respective components are present in a composition, an amount or content of each component in the composition means the total amount or content of the plural substances present in the composition unless otherwise specified.

In the present disclosure, each component may include plural kinds of particles corresponding to the component. In the case in which plural kinds of particles corresponding to respective components are present in a composition, a particle diameter of the component means a value with respect to the mixture of the plural kinds of particles present in the composition, unless otherwise specified.

The term "layer" as used herein encompasses, when a region in which the layer or the film is present is observed, not only a case in which the layer is formed over the entire observed region, but also a case in which the layer is formed at only a part of the observed region.

The term "layered" as used herein means disposing layers on one another, in which two or more layers may be bonded with each other, or may be attachable to/detachable from one another.

The term "epoxy compound" as used herein refers to a compound having an epoxy group in a molecule thereof. The term "epoxy resin" indicates a group of epoxy compounds in an uncured state.

<<Epoxy Resin>>

An epoxy resin in the present disclosure includes an epoxy compound having a mesogenic structure, a curing product of the epoxy resin having a flexural modulus of 3.0 GPa or more at 23° C., a fracture toughness of 1.0 MPa·m$^{1/2}$ or more, and a glass transition temperature of 150° C. or higher.

To date, in fiber-reinforced composite materials for airplanes or the like, a method involving, for example, providing a resin layer in which thermoplastic resin particles such as polyamide are dispersed at a surface area of an epoxy resin prepreg, and the produced layers are disposed on one another, has been adopted. This method allows for improving the toughness in the compression direction by the presence of a resin layer that contains a flexible thermoplastic resin between epoxy resin layers.

On the other hand, it was found that a fiber-reinforced composite material that is applicable to the structural frameworks of airplanes or the like can be produced without providing a resin layer containing a thermoplastic resin between the layers, by applying the epoxy resin according to the present disclosure, which satisfies both a flexural modulus of 3.0 GPa or more and a fracture toughness of 1.0 MPa·m$^{1/2}$ or more, to a reinforcing material such as carbon fibers. It is presumed that, by the epoxy resin having the foregoing flexural modulus and fracture toughness, occurrence of cracks in the cured product of the epoxy resin itself can be favorably suppressed, which enables the production of fiber-reinforced composite materials for airplanes without, for example, additionally providing a resin layer in which a thermoplastic resin is dispersed.

In addition, the epoxy resin according to the present disclosure has a glass transition temperature of 150° C. or higher, thereby having excellent thermal resistance as a fiber-reinforced composite material for airplanes.

As described above, by the epoxy resin according to the present disclosure, the manufacturing process of a fiber-reinforced composite material can be simplified by eliminating the need for the process of, for example, localizing the particles of a thermoplastic resin at the surface area of a prepreg.

The epoxy resin in the present disclosure may or may not contain an epoxy resin that does not have a mesogenic structure, as long as it contains an epoxy resin having a mesogenic structure.

<Epoxy Compound Having Mesogenic Structure>

A mesogenic structure refers to a structure that is capable of causing an epoxy resin that is a reaction product of an epoxy compound having the mesogenic structure to exhibit liquid crystallinity. Specific examples of the mesogenic structure include a biphenyl structure, a phenyl benzoate structure, a cyclohexyl benzoate structure, an azobenzene structure, a stilbene structure, a terphenyl structure, an anthracene structure, derivatives of these structures, and a structure in which two or more of these mesogenic structures are linked via a linking group.

One molecule of the epoxy compound may have one mesogenic structure, or two or more mesogenic structures. In an epoxy compound having two or more mesogenic structures, the two or more mesogenic structures may be the same or different.

An epoxy resin containing an epoxy compound having a mesogenic structure can form a higher-order structure in a cured product of an epoxy resin composition containing the epoxy resin. Here, the higher-order structure refers to a structure containing a higher-order structural body in which its components are arranged to form a micro- and organized structure. Examples of the higher-order structure include a crystalline phase and a liquid crystalline phase. The presence or absence of the higher-order structure can be determined using a polarized light microscope. Specifically, the presence or absence of the higher-order structure can be determined by whether or not an interference pattern due to depolarization is observed under crossed Nicols. The higher-order structure generally exists in a cured product of an epoxy resin composition in an island shape to form a domain structure, in which each island corresponds to the higher-order structure. The components of the higher-order structure are generally formed by covalent bonding.

Examples of the higher-order structure formed in a cured product include a nematic structure and a smectic structure.

The nematic structure and smectic structure are each a type of liquid crystal structure. The nematic structure is a liquid crystal structure that has only an orientational ordering in which the major axes of the molecules are oriented in the same direction. On the other hand, the smectic structure is a liquid crystal structure that has a one-dimension positional ordering in addition to the orientational ordering, and has a layered structure. The degree of ordering is higher in the smectic structure than in the nematic structure. Therefore, from the viewpoints of thermal conductivity and fracture toughness of the cured product, it is more preferable that a higher-order structure having a smectic structure is formed.

Whether or not a smectic structure is formed in a cured product can be determined by X-ray diffraction measurement of the cured product. The X-ray diffraction measurement can be performed using, for example, an X-ray diffractometer by Rigaku Corporation. In the present disclosure, the formation of the smectic structure in a cured product is confirmed when a diffraction peak is observed in a range of $2\theta=2°$ to $10°$, the X-ray diffraction measurement being performed using $CuK\alpha1$ radiation under a tube voltage of 40 kV and a tube current of 20 mA in a measurement range of $2\theta=2°$ to $30°$.

An epoxy resin containing an epoxy compound having a mesogenic structure tends to form a higher-order structure when cured. Therefore, an epoxy resin containing an epoxy compound having a mesogenic structure tends to have superior fracture toughness of the cured product as compared to an epoxy resin not containing an epoxy compound having a mesogenic structure.

The mesogenic structure may be a structure represented by the following General Formula (1).

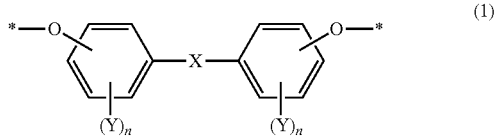

(1)

In General Formula (1), X represents a single bond or a linking group that includes at least one divalent group selected from the following Group (A); each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; and * represents a bonding site to an adjacent atom.

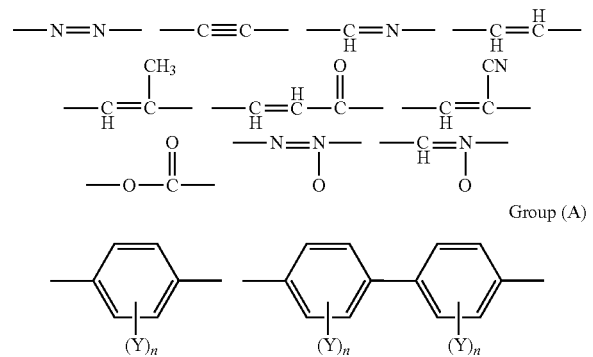

Group (A)

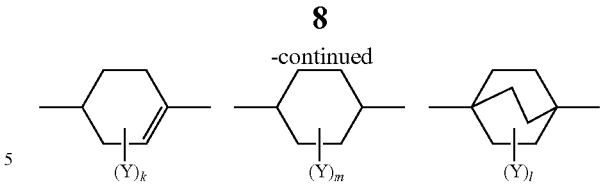

In Group (A), each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; k represents an integer from 0 to 7; m represents an integer from 0 to 8; and l represents an integer from 0 to 12.

In the mesogenic structure represented by General Formula (1), when X is a linking group that includes at least one divalent group selected from Group (A), the linking group is preferably a linking group that includes at least one divalent group selected from the following Group (Aa), and more preferably is a linking group that includes at least one divalent group selected from Group (Aa) and has at least one ring structure.

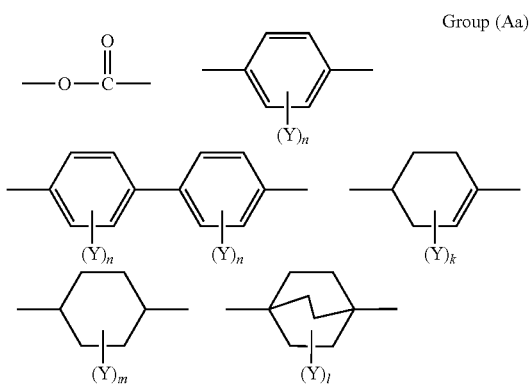

Group (Aa)

In Group (Aa), each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; k represents an integer from 0 to 7; m represents an integer from 0 to 8; and l represents an integer from 0 to 12.

From the viewpoint of the tendency to form a higher-order structure in a cured product, it is preferable that the mesogenic structure represented by General Formula (1) includes a mesogenic structure represented by the following General Formula (2).

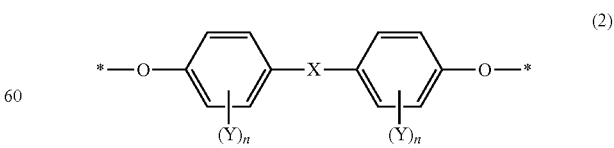

(2)

In General Formula (2), X represents a single bond or a linking group that includes at least one divalent group selected from Group (A); each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; and * represents a bonding site to an adjacent atom.

Preferable examples of the mesogenic structure represented by General Formula (2) include a mesogenic structure represented by the following General Formula (3) and a mesogenic structure represented by the following General Formula (4).

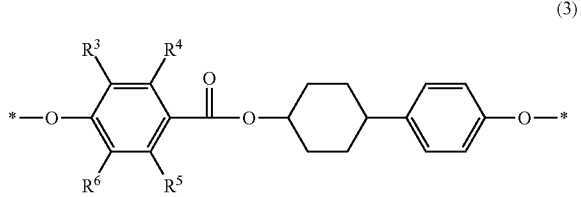
(3)

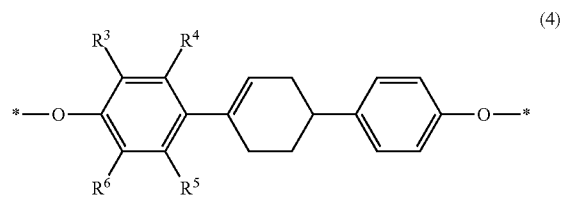
(4)

In General Formula (3) and General Formula (4), each of $R^3$ to $R^6$ independently represents a hydrogen atom or an alkyl group having 1 to 3 carbon atoms; and * represents a bonding site to an adjacent atom.

Each of $R^3$ to $R^6$ is preferably independently a hydrogen atom or an alkyl group having 1 or 2 carbon atoms, more preferably a hydrogen atom or a methyl group, and further preferably a hydrogen atom. It is preferable that two to four of $R^3$ to $R^6$ are hydrogen atoms, and is more preferable that three or four of $R^3$ to $R^6$ are hydrogen atoms, and is further preferable that all four are hydrogen atoms. In a case in which any one of $R^3$ to $R^6$ is an alkyl group having 1 to 3 carbon atoms, it is preferable that at least one of $R^3$ or $R^6$ is an alkyl group having 1 to 3 carbon atoms.

The epoxy compound having a mesogenic structure may be an epoxy compound having a structure represented by the following General Formula (1-m).

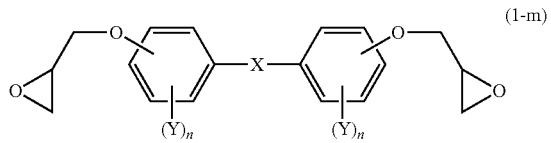
(1-m)

In General Formula (1-m), definitions and preferable examples of X, Y and n are the same as the definitions and preferable examples of X, Y and n in General Formula (1) described above.

From the viewpoint of forming a higher-order structure in a cured product, the epoxy compound represented by General Formula (1-m) is preferably an epoxy compound having a structure represented by the following General Formula (2-m).

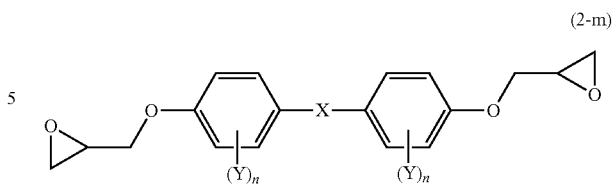
(2-m)

In General Formula (2-m), definitions and preferable examples of X, Y and n are the same as the definitions and preferable examples of X, Y and n in General Formula (1-m).

The epoxy compound represented by General Formula (1-m) is more preferably an epoxy compound having a structure represented by the following General Formula (3-m) or General Formula (4-m).

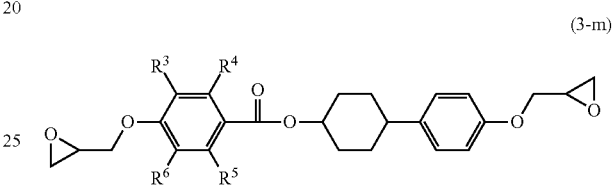
(3-m)

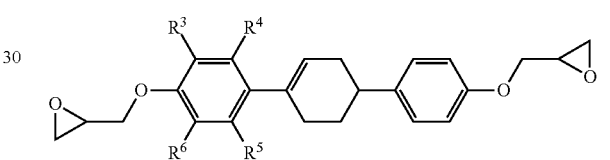
(4-m)

In General Formula (3-m) and General Formula (4-m), definitions and preferable examples of $R^3$ to $R^6$ are the same as the definitions and preferable examples of $R^3$ to $R^6$ in General Formula (3) and General Formula (4).

<Epoxy Compound Different from Epoxy Compound Having Mesogenic Structure>

The epoxy resin may contain an epoxy compound different from the epoxy compound having a mesogenic structure. Examples of the epoxy compound different from the epoxy compound having a mesogenic structure include an epoxy compound having an aromatic ring. The epoxy compound having an aromatic ring is preferably a compound having an aromatic ring bonded with one or more glycidyl ether groups, and more preferably a compound having an aromatic ring bonded with two glycidyl ether groups.

Examples of the aromatic ring include a benzene ring and a naphthalene ring.

One kind of epoxy compound different from the epoxy compound having a mesogenic structure may be used singly, or two or more kinds thereof may be used in combination.

The epoxy compound different from the epoxy compound having a mesogenic structure preferably has two epoxy groups. In the case in which the epoxy compound different from the epoxy compound having a mesogenic structure has two epoxy groups, gelation of the epoxy resin tends to be suppressed, whereby a cured product is formed in a favorable manner.

Examples of the epoxy compound different from the epoxy compound having a mesogenic structure include an epoxy compound represented by the following General Formula (1-a) and an epoxy compound represented by the following General Formula (1-b).

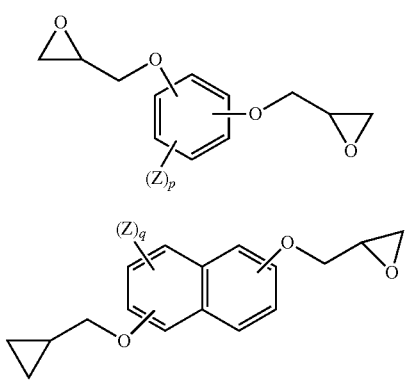

(1-a)

(1-b)

In General Formula (1-a) and General Formula (1-b), each Z independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; p represents an ineger from 0 to 4; and q represents an integer from 0 to 6.

p is preferably from 0 to 2, and is more preferably 0.

q is preferably from 0 to 4, more preferably from 0 to 2, and further preferably 0.

In particular, the epoxy compound different from the epoxy compound having a mesogenic structure is preferably at least one of the epoxy compounds represented by the following General Formula (1-c) to General Formula (1-e).

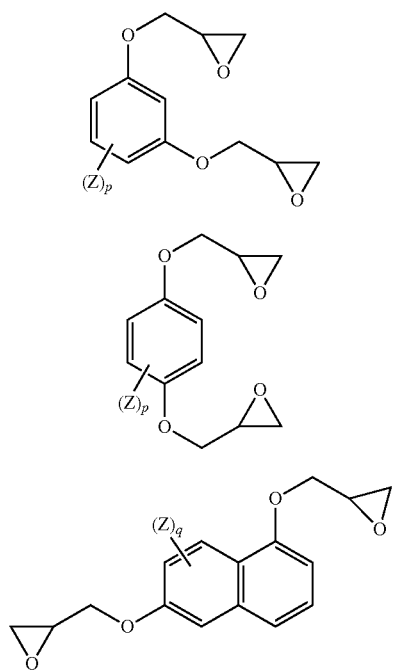

(1-c)

(1-d)

(1-e)

In General Formulae (1-c) to (1-e), definitions and preferable examples of Z, p, and q are the same as the definitions and preferable examples of Z, p, and q in General Formula (1-a) and General Formula (1-b).

<Epoxy Compound Having Two or More Mesogenic Structures (Specific Epoxy Compound)>

The epoxy compound having a mesogenic structure may be an epoxy compound having two or more mesogenic structures (hereinafter, also referred to as a "specific epoxy compound"). An epoxy compound having two or more mesogenic structures tends to have lower viscosity before curing as compared to an epoxy compound having one mesogenic structure (hereinafter, also referred to as a "mesogenic epoxy monomer"), and tends to have favorable handleability.

The structure of the specific epoxy compound is not particularly limited as long as it is an epoxy compound having two or more mesogenic structures. For example, the specific epoxy compound may be a dimer of a mesogenic epoxy monomer, or may be a tri- or higher multimer of a mesogenic epoxy monomer. The two or more mesogenic structures in the specific epoxy compound may be the same as or different from each other.

The specific epoxy compound preferably has a structure in which at least two or more mesogenic structures are linked via a divalent aromatic group. In this case, the at least two mesogenic structures may be directly bonded to the divalent aromatic group, or may be bonded to the divalent aromatic group via a linking group.

In the present disclosure, in the case in which the mesogenic structures included in the specific epoxy compound have a divalent aromatic group, the divalent aromatic group that is present between two mesogenic structures is regarded to be different from the divalent aromatic groups included in the mesogenic structures.

Examples of the divalent aromatic group that is present between two mesogenic structures include a phenylene group, a divalent biphenyl group, and a naphthylene group. Examples of the phenylene group include a structure represented by the following General Formula (5A). Examples of the divalent biphenyl group include a structure represented by the following General Formula (5B). Examples of the naphthylene group include a structure represented by the following General Formula (5C).

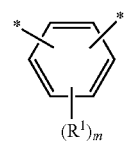

(5A)

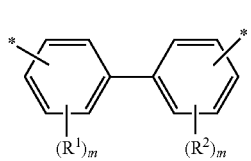

(5B)

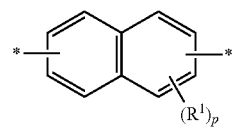

(5C)

In General Formula (5A), General Formula (5B) and General Formula (5C), * represents a bonding site to an adjacent atom. Examples of the adjacent atom include an oxygen atom and a nitrogen atom. Each of $R^1$ and $R^2$ independently represents an alkyl group having 1 to 8 carbon atoms. Each m independently represents an integer from 0 to 4. p represents an integer from 0 to 6.

Each of $R^1$ and $R^2$ is independently preferably an alkyl group having 1 to 3 carbon atoms, and more preferably a methyl group.

Each m is independently preferably an integer from 0 to 2, more preferably an integer from 0 to 1, and further preferably 0. p is preferably an integer from 0 to 2, and more preferably an integer from 0 to 1.

In particular, in the structure represented by General Formula (5A), a structure represented by the following General Formula (5a) is preferable, and in the structure represented by General Formula (5B), a structure represented by the following General Formula (5b) is preferable. In the structure represented by General Formula (5C), a structure represented by the following General Formula (5c-1) and a structure represented by the following General Formula (5c-2) are preferable. It is thought that epoxy compounds having these structures have a high degree of molecular stacking property and are more likely to form a higher-order structure.

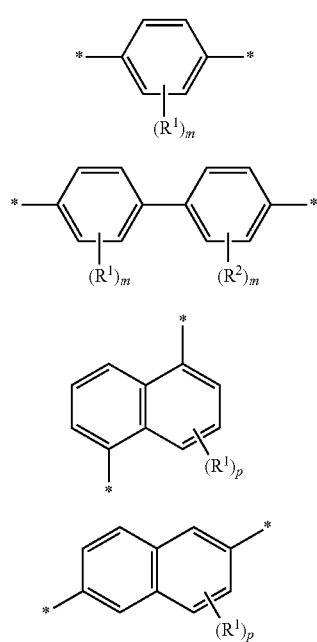

In General Formula (5a), General Formula (5b), General Formula (5c-1) and General Formula (5c-2), definitions and preferable examples of $R^1$, $R^2$, m and p are the same as the definitions and preferable examples of $R^1$, $R^2$, m and p in General Formula (5A), General Formula (5B) and General Formula (5C). * represents a bonding site to an adjacent atom.

The specific epoxy compound may be an epoxy compound having a structure represented by the following General Formula (1-A), General Formula (1-B) or General Formula (1-C).

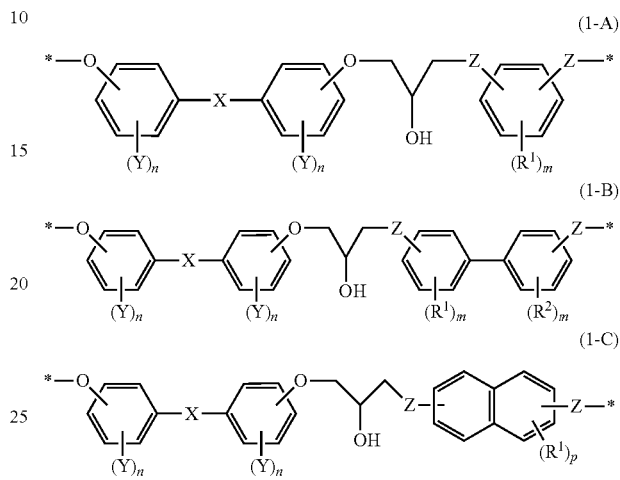

In General Formula (1-A), General Formula (1-B) and General Formula (1-C), definitions and preferable examples of X, Y and n are the same as the definitions and preferable examples of X, Y and n in General Formula (1). Further, definitions and preferable examples of $R^1$, $R^2$, m and p are the same as the definitions and preferable examples of $R^1$, $R^2$, m and p in General Formula (5A), General Formula (5B) and General Formula (5C). Each Z independently represents —O— or —NH—. * represents a bonding site to an adjacent atom.

From the viewpoint of forming a higher-order structure in a cured product, the epoxy compound having a structure represented by General Formula (1-A) is preferably an epoxy compound having a structure represented by the following General Formula (2-A); the epoxy compound having a structure represented by General Formula (1-B) is preferably an epoxy compound having a structure represented by the following General Formula (2-B); and the epoxy compound having a structure represented by General Formula (1-C) is preferably an epoxy compound having a structure represented by the following General Formula (2-C).

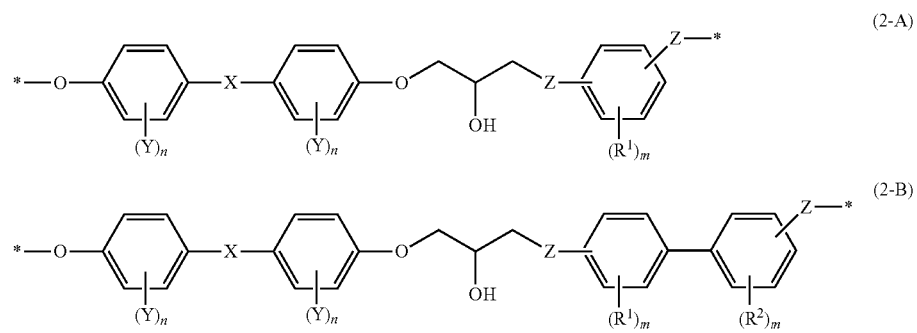

-continued

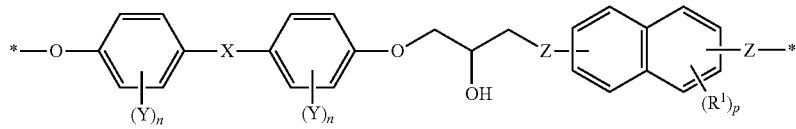
(2-C)

In General Formula (2-A), General Formula (2-B) and General Formula (2-C), definitions and preferable examples of X, Y, n, m, p, $R^1$, $R^2$ and Z are the same as the definitions and preferable examples of X, Y, n, m, p, $R^1$, $R^2$ and Z in General Formula (1-A), General Formula (1-B) and General Formula (1-C). * represents a bonding site to an adjacent atom.

Examples of the epoxy compound having a structure represented by General Formula (1-A) include an epoxy compound having at least one structure selected from the group consisting of the following General Formula (3-A-1) to General Formula (3-A-4).

Examples of the epoxy compound having a structure represented by General Formula (1-B) include an epoxy compound having at least one structure selected from the group consisting of the following General Formula (3-B-1) to General Formula (3-B-4).

Examples of the epoxy compound having a structure represented by General Formula (1-C) include an epoxy compound having at least one structure selected from the group consisting of the following General Formula (3-C-1) to General Formula (3-C-4).

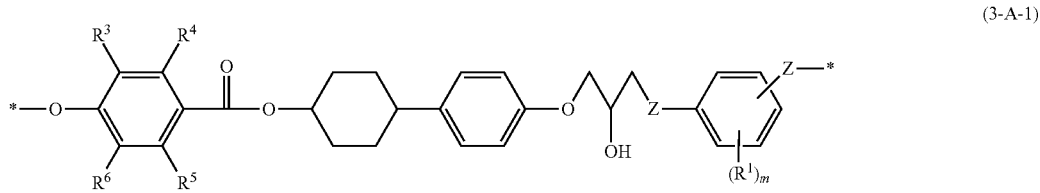
(3-A-1)

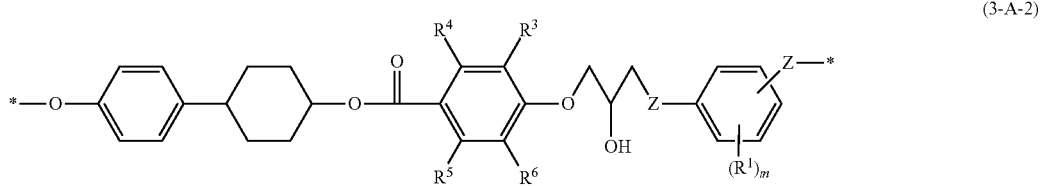
(3-A-2)

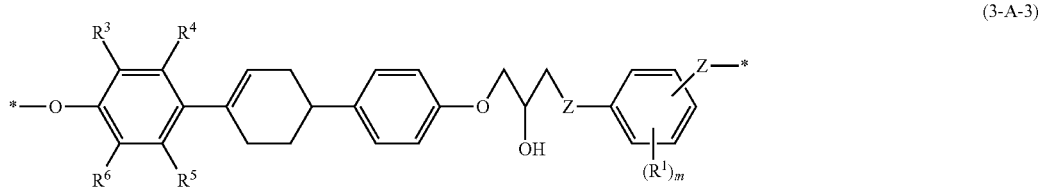
(3-A-3)

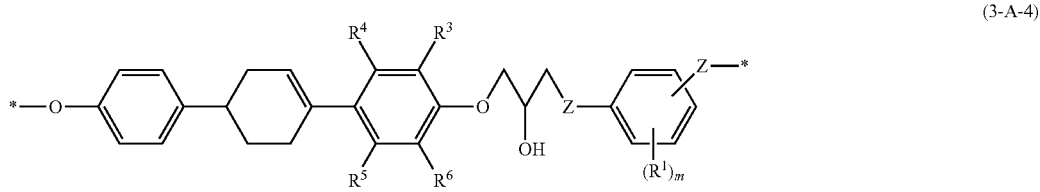
(3-A-4)

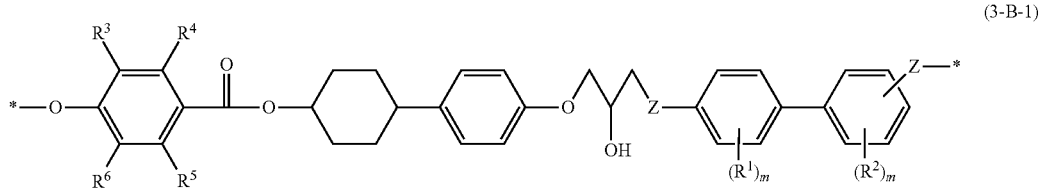
(3-B-1)

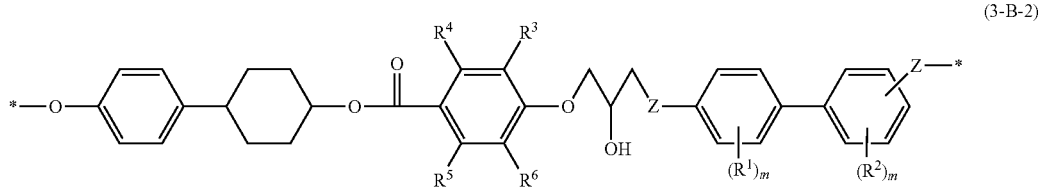
(3-B-2)

-continued

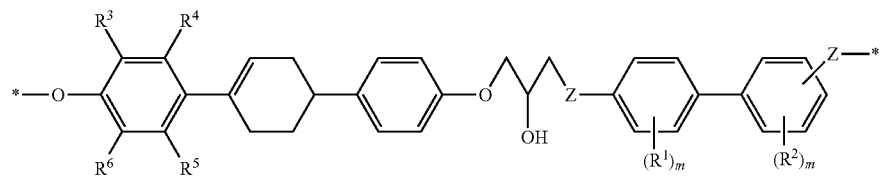
(3-B-3)

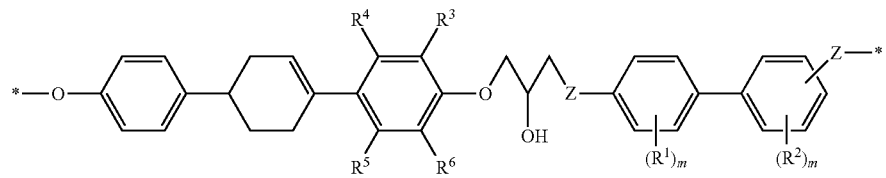
(3-B-4)

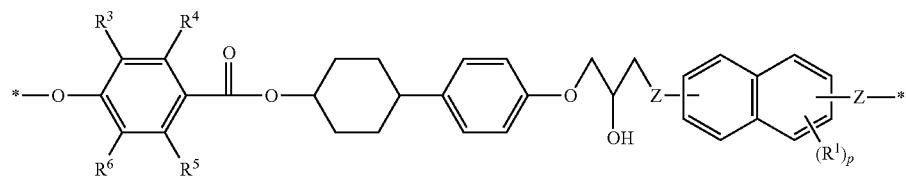
(3-C-1)

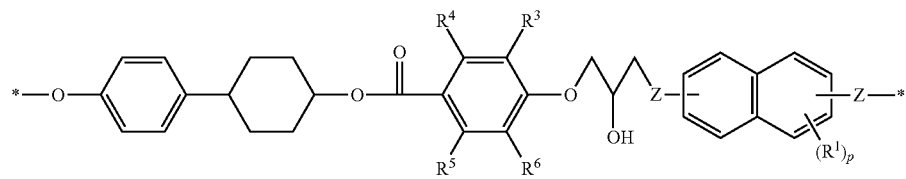
(3-C-2)

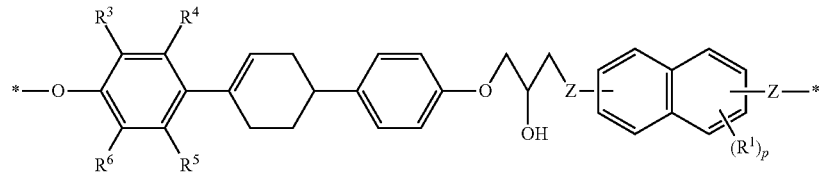
(3-C-3)

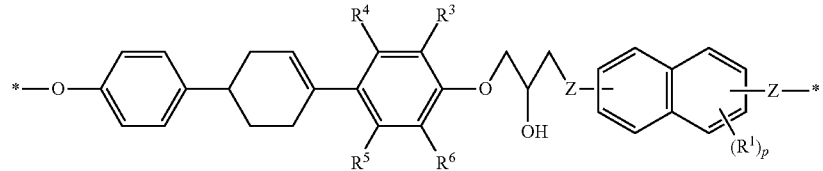
(3-C-4)

In General Formulae (3-A-1) to (3-A-4), General Formulae (3-B-1) to (3-B-4) and General Formulae (3-C-1) to (3-C-4), definitions and preferable examples of $R^{2\prime}$ m, p and Z are the same as the definitions and preferable examples of R', $R^{2\prime}$ m, p and Z in General Formula (1-A), General Formula (1-B) and General Formula (1-C). The definitions and preferable examples of $R^3$ to $R^6$ are the same as the definitions and preferable examples of $R^3$ to $R^6$ in General Formula (3) or General Formula (4). * represents a bonding site to an adjacent atom.

The specific epoxy compound may have at least one structure selected from the group consisting of General Formulae (1-a') and (1-b'). By the specific epoxy compound having at least one structure selected from the group consisting of (1-a') and (1-b'), elastic modulus tends to be improved.

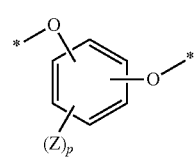
(1-a')

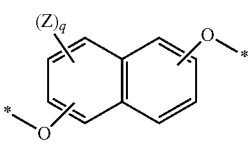
(1-b')

In General Formula (1-a') and General Formula (1-b'), definitions and preferable examples of Z, p and q are the same as the definitions and preferable examples of Z, p and q in General Formula (1-a) and General Formula (1-b). * represents a bonding site to an adjacent atom.

The structure represented by General Formula (1-a') is preferably a structure represented by General Formula (1-c') or a structure represented by General Formula (1-d'). The structure represented by General Formula (1-b') is preferably a structure represented by General Formula (1-e').

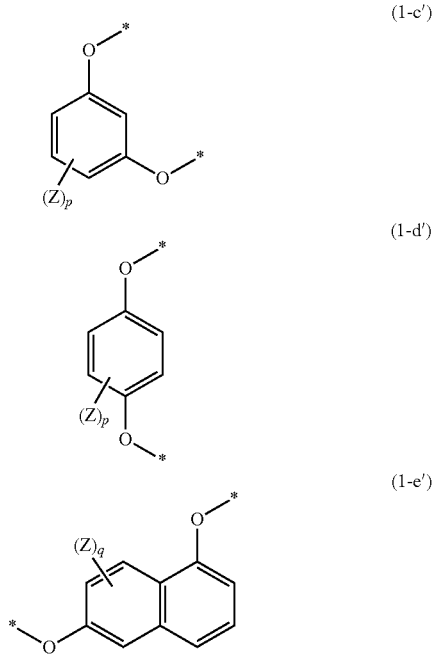

In General Formula (1-c') to General Formula (1-e'), definitions and preferable examples of Z, p and q are the same as the definitions and preferable examples of Z, p and q in General Formula (1-c) to General Formula (1-e). * represents a bonding site to an adjacent atom.

The specific epoxy compound may be a reaction product between an epoxy compound having a mesogenic structure and a compound having a functional group that is capable of reacting with an epoxy group. The specific epoxy compound may be a reaction product of an epoxy compound having a mesogenic structure, an epoxy compound different from the epoxy compound having a mesogenic structure, and a compound having a functional group that is capable of reacting with an epoxy group.

[Synthesis Method of Specific Epoxy Compound]

The method for synthesizing the specific epoxy compound is not particularly limited. The method for synthesizing the specific epoxy compound may be, for example, one in which a compound having one mesogenic structure and an epoxy group (hereinafter also referred to as a mesogenic epoxy monomer), a compound having a functional group that is capable of reacting with an epoxy group, and if necessary, an epoxy compound different from the epoxy compound having a mesogenic structure, are reacted to obtain the specific epoxy compound.

The structure of the mesogenic epoxy monomer is not particularly limited, and the mesogenic epoxy monomer may be, for example, the above-described epoxy compound having a structure represented by General Formula (1-m). Details of the epoxy compound different from the epoxy compound having a mesogenic structure are as described above.

The compound having a functional group that is capable of reacting with an epoxy group is not particularly limited, and is preferably an aromatic compound having a functional group that is capable of reacting with an epoxy group.

Examples of the functional group that is capable of reacting with an epoxy group include a hydroxy group, an amino group, an isocyanate group and the like. The aromatic compound having a functional group that is capable of reacting with an epoxy group may have one functional group that is capable of reacting with an epoxy group, or two or more functional groups that are capable of reacting with an epoxy group, and preferably has two. The functional group may or may not be directly bonded to the aromatic ring, and may be bonded to the aromatic ring via, for example, an alkylene oxide chain, such as an ethylene oxide chain or a propylene oxide chain, or an alkyl chain.

From the viewpoint of forming a smectic structure in a cured product, the aromatic compound having a functional group that is capable of reacting with an epoxy group is preferably at least one (hereinafter also referred to as a "specific aromatic compound") selected from the group consisting of: a dihydroxybenzene compound in which two hydroxy groups are bonded to one benzene ring; a diaminobenzene compound in which two amino groups are bonded to one benzene ring; a dihydroxybiphenyl compound in which each of the two benzene rings constituting a biphenyl structure is bonded with one hydroxy group; a diaminobiphenyl compound in which each of the two benzene rings constituting a biphenyl structure is bonded with one amino group; a dihydroxynaphthalene compound in which two hydroxy groups are bonded to one naphthalene ring; and a diaminonaphthalene compound in which two amino groups are bonded to one naphthalene ring.

Examples of the dihydroxybenzene compound include catechol, resorcinol, hydroquinone, and derivatives thereof.

Examples of the diaminobenzene compound include 1,2-diaminobenzene, 1,3-diaminobenzene, 1,4-diaminobenzene, and derivatives thereof.

Examples of the dihydroxybiphenyl compound include 2,2'-dihydroxybiphenyl, 2,3'-dihydroxybiphenyl, 2,4'-dihydroxybiphenyl, 3,3'-dihydroxybiphenyl, 3,4'-dihydroxybiphenyl, 4,4'-dihydroxybiphenyl, and derivatives thereof.

Examples of the diaminobiphenyl compound include 2,2'-diaminobiphenyl, 2,3'-diaminobiphenyl, 2,4'-diaminobiphenyl, 3,3'-diaminobiphenyl, 3,4'-diaminobiphenyl, 4,4'-diaminobiphenyl, and derivatives thereof.

Examples of the dihydroxynaphthalene compound include 1,2-dihydroxynaphthalene, 1,3-dihydroxynaphthalene, 1,4-dihydroxynaphthalene, 1,5-dihydroxynaphthalene, 1,6-dihydroxynaphthalene, 1,7-dihydroxynaphthalene, 1,8-dihydroxynaphthalene, 2,3-dihydroxynaphthalene, 2,6-dihydroxynaphthalene, 2,7-dihydroxynaphthalene, and derivatives thereof.

Examples of the diaminonaphthalene compound includes 1,2-diaminonaphthalene, 1,3-diaminonaphthalene, 1,4-diaminonaphthalene, 1,5-diaminonaphthalene, 1,6-diaminonaphthalene, 1,7-diaminonaphthalene, 1,8-diaminonaphthalene, 2,3-diaminonaphthalene, 2,6-diaminonaphthalene, 2,7-diaminonaphthalene, and derivatives thereof.

Examples of a derivative of the specific aromatic compound include a compound in which a substituent, such as an alkyl group having 1 to 8 carbon atoms, is bonded to the benzene ring or naphthalene ring of the specific aromatic compound. One kind of specific aromatic compound may be used singly, or two or more kinds thereof may be used in combination.

The equivalent weight of the functional group of the compound having a functional group that is capable of reacting with an epoxy group is not particularly limited. From the viewpoint of reaction efficiency, the equivalent weight of the functional group of the compound having a functional group that is capable of reacting with an epoxy group (in a case in which the functional group is an amino group, the equivalent weight of the active hydrogen) is preferably from 65 g/eq to 200 g/eq, more preferably from 70 g/eq to 150 g/eq, and further preferably from 75 g/eq to 100 g/eq.

The method of reacting the mesogenic epoxy monomer, a compound having a functional group that is capable of reacting with an epoxy group, and an optional epoxy compound different from the epoxy compound having a mesogenic structure to synthesize the specific epoxy compound is not particularly limited. Specifically, for example, the specific epoxy compound can be synthesized by dissolving, in a solvent, a mesogenic epoxy monomer, a compound having a functional group that is capable of reacting with an epoxy group, an optional epoxy compound different from the epoxy compound having a mesogenic structure and an optional reaction catalyst, and heating the mixture while stirring.

Alternatively, for example, the specific epoxy compound can be synthesized by mixing a mesogenic epoxy monomer, a compound having a functional group that is capable of reacting with an epoxy group, an optional epoxy compound different from the epoxy compound having a mesogenic structure and an optional reaction catalyst without using a solvent, and heating the mixture while stirring.

The solvent is not particularly limited as long as it can dissolve the mesogenic epoxy monomer, the compound having a functional group that is capable of reacting with an epoxy group, and the optional epoxy compound different from the epoxy compound having a mesogenic structure, and can be heated to a temperature required to allow the reaction of these compounds to proceed. Specific examples of the solvent include cyclohexanone, cyclopentanone, ethyl lactate, propyleneglycol monomethyl ether, N-methylpyrrolidone, methyl cellosolve, ethyl cellosolve, and propyleneglycol monopropyl ether.

The amount of the solvent is not particularly limited as long as the mesogenic epoxy monomer, the compound having a functional group that is capable of reacting with an epoxy group, the optional epoxy compound different from the epoxy compound having a mesogenic structure and the optional reaction catalyst can be dissolved at the reaction temperature. Although the solubility depends on the type of raw materials to be subjected to the reaction, the type of solvent and the like, the viscosity of the solution after the reaction tends to be in a preferred range when, for example, the solvent is used in an amount such that the initial solid content concentration becomes from 20% by mass to 60% by mass.

The type of reaction catalyst is not particularly limited, and an appropriate catalyst may be selected based on the reaction rate, reaction temperature, storage stability and the like. Specific examples of the reaction catalyst include an imidazole compound, an organic phosphorous compound, a tertiary amine compound and a quaternary ammonium salt. One kind of reaction catalyst may be used singly, or two or more kinds thereof may be used in combination.

From the viewpoint of thermal resistance of the cured product, the reaction catalyst is preferably an organic phosphorous compound.

Preferable examples of the organic phosphorous compound include an organic phosphine compound; a compound having intramolecular polarization obtained by adding, to an organic phosphine compound, a compound having a π bond such as a maleic acid anhydride, a quinone compound, diazodiphenylmethane or a phenol resin; and a complex formed by an organic phosphine compound and an organic boron compound. In particular, a compound obtained by adding a quinone compound to an organic phosphine compound is preferable.

Specific examples of the organic phosphine compound include triphenylphosphine, diphenyl(p-tolyl)phosphine, tris(alkylphenyl)phosphine, tris(alkoxyphenyl)phosphine, tris(alkylalkoxyphenyl)phosphine, tris(dialkylphenyl)phosphine, tris(trialkylphenyl)phosphine, tris(tetraalkylphenyl)phosphine, tris(dialkoxyphenyl)phosphine, tris(trialkoxyphenyl)phosphine, tris(tetraalkoxyphenyl)phosphine, trialkylphosphine, dialkylarylphosphine, and alkyldiarylphosphine.

Specific examples of the quinone compound include 1,4-benzoquinone, 2,5-toluquinone, 1,4-naphthoquinone, 2,3-dimethylbenzoquinone, 2,6-dimethylbenzoquinone, 2,3-dimethoxy-5-methyl-1,4-benzoquinone, 2,3-dimethoxy-1,4-benzoquinone and phenyl-1,4-benzoquinone.

Specific examples of the organic boron compound include tetraphenyl borate, tetra-p-tolyl borate and tetra-n-butyl borate.

The amount of the reaction catalyst is not particularly limited. From the viewpoints of the reaction rate and storage stability, the amount of the reaction catalyst is preferably from 0.1 parts by mass to 1.5 parts by mass, and more preferably from 0.2 parts by mass to 1 part by mass, with respect to 100 parts by mass of the total amount of the mesogenic epoxy monomer, the optional epoxy compound different from the epoxy compound having a mesogenic structure, and the compound having a functional group that is capable of reacting with an epoxy group.

Synthesis of the specific epoxy compound may be performed using a reaction container, such as a flask for small-scale synthesis, or a reaction cauldron for large-scale synthesis. A specific example of the synthesis method is described below. A mesogenic epoxy monomer and an optional epoxy compound different from the epoxy compound having a mesogenic structure are placed in a reaction container, with a solvent being added as necessary, and the mesogenic epoxy monomer and the optional epoxy compound different from the epoxy compound having a mesogenic structure are dissolved by heating the reaction container to a reaction temperature with an oil bath or a heating medium. A compound having a functional group that is capable of reacting with an epoxy group is added thereto, with a reaction catalyst being added as necessary, to initiate the reaction. Subsequently, the solvent is distilled off as necessary under reduced pressure, whereby a specific epoxy compound is obtained.

The reaction temperature is not particularly limited as long as the reaction between the functional group that is capable of reacting with an epoxy group and the epoxy group of the mesogenic epoxy monomer and of the optional epoxy compound different from the epoxy compound having a mesogenic structure proceeds. For example, the reaction temperature is preferably in a range of from 100° C. to 180° C., and more preferably in a range of from 100° C. to 150° C. In the case in which the reaction temperature is 100° C. or higher, the time for completing the reaction tends to be shortened. In the case in which the reaction temperature is 180° C. or lower, likelihood of gelation tends to be reduced.

When the specific epoxy compound is synthesized, the ratio between the epoxy compound (i.e., the mesogenic epoxy monomer and the optional epoxy compound different from the epoxy compound having a mesogenic structure) and the compound having a functional group that is capable of reacting with an epoxy group, which are used as raw materials, is not particularly limited. For example, the ratio may be adjusted such that the ratio of the number of equivalents of the epoxy group (A) to the number of equivalents of the functional group that is capable of reacting with an epoxy group (B), represented by A:B, becomes in a range of 10:10 to 10:0.01. From the viewpoints of fracture toughness and thermal resistance of the cured product, the range of A:B is preferably in a range of 10:5 to 10:0.1.

From the viewpoint of ease of handling of the specific epoxy compound, the ratio of the number of equivalents of the epoxy group (A) to the number of equivalents of the functional group that is capable of reacting with an epoxy group (B) (i.e., A:B) is preferably in a range of 10:1.6 to 10:3.0, more preferably in a range of 10:1.8 to 10:2.9, and further preferably in a range of 10:2.0 to 10:2.8.

From the viewpoints of effectively achieving both favorable flexural modulus and fracture toughness, the ratio between the number of equivalents of the epoxy group (A) and the number of equivalents of the functional group that is capable of reacting with an epoxy group (B) (i.e., A:B) is preferably in a range of 10:1.0 to 10:3.0, more preferably in a range of 10:1.4 to 10:2.6, and further preferably in a range of 10:1.6 to 10:2.4.

The structure of the specific epoxy compound obtained by the synthesis can be determined by, for example, matching the molecular weight of the specific epoxy compound that is predicted to be obtained from the reaction between the mesogenic epoxy monomer used for the synthesis and the optional epoxy compound different from the epoxy compound having a mesogenic structure and the compound having a functional group that is capable of reacting with an epoxy group, with the molecular weight of the targeted compound determined by liquid chromatography using a liquid chromatograph equipped with a UV spectrum detector and a mass spectrum detector.

The liquid chromatography is performed by a gradient method using an analysis column (e.g., LaChrom II C18 from Hitachi, Ltd.) while continuously changing the mixture ratio (by volume) of the eluent in the order of acetonitrile/tetrahydrofuran/10 mmol/1 aqueous ammonium acetate solution=20/5/75, acetonitrile/tetrahydrofuran=80/20 (20 min from the start), and acetonitrile/tetrahydrofuran=50/50 (35 min from the start). The liquid chromatography is performed at a flow rate of 1.0 ml/min. The UV spectrum detector detects the absorbance at a wavelength of 280 nm, and the detection by the mass spectrum detector is performed with an ionization voltage of 2700 V.

The epoxy resin preferably contains both the specific epoxy compound and the mesogenic epoxy monomer. In the case in which the epoxy resin contains the specific epoxy compound and the mesogenic epoxy monomer at a proper ratio, ease of handling before curing tends to be improved. Further, the crosslink density during curing tends to become higher, whereby an epoxy resin cured product having an improved thermal resistance tends to be obtained. The ratio between the specific epoxy compound and the mesogenic epoxy monomer can be adjusted by the mixing ratio between the mesogenic epoxy monomer and the compound having a functional group that is capable of reacting with an epoxy group, or other conditions for the reaction.

The content of the mesogenic epoxy monomer contained in the epoxy resin is preferably 50% or less with respect to the entire epoxy resin. An epoxy resin in which the content of the mesogenic epoxy monomer is 50% or less tends to have favorable handleability as compared to an epoxy resin in which the content of the mesogenic epoxy monomer exceeds 50%, since the viscosity tends to be lowered easily as temperature increases. Although the reason for this is not clear, it is presumed that, in a case in which the content of the mesogenic epoxy monomer is 50% or less with respect to the entire epoxy resin, crystal deposition at a temperature under the melting temperature of the epoxy resin can be further suppressed as compared to the case in which the content of the mesogenic epoxy monomer exceeds 50%.

In the present disclosure, the content of the mesogenic epoxy monomer in the epoxy resin can be calculated, for example, based on a chart obtained by liquid chromatography.

More specifically, the content of the mesogenic epoxy monomer in the epoxy resin is obtained as a percentage (%) of the area of the peak originated from the mesogenic epoxy monomer with respect to the total area of the peaks originated from all the components that constitute the epoxy resin. Specifically, the absorbance of the epoxy resin of interest is detected at a wavelength of 280 nm, and the calculation is carried out using the following equation based on the total area of all the detected peaks and the area of the peak corresponding to the mesogenic epoxy monomer.

Percentage of the area of the peak originated from the mesogenic epoxy monomer (%)=(area of the peak corresponding to the mesogenic epoxy monomer/total area of the peaks originated from all the components constituting the epoxy resin)×100

The liquid chromatography is performed at a sample concentration of 0.5% by mass and a flow rate of 1.0 ml/min, using tetrahydrofuran as a mobile phase. The measurement can be performed by using, for example, a high performance liquid chromatograph L6000 from Hitachi, Ltd. and a data analyzer C-R4A from Shimadzu Corporation. For the column, for example, a GPC column such as G2000HXL or G3000 HXL from Tosoh Corporation can be used.

From the viewpoint of improving ease of handling, the ratio of the mesogenic epoxy monomer is preferably 50% or less, more preferably 49% or less, and further preferably 48% or less, with respect to the entire epoxy resin.

From the viewpoint of reducing the intrinsic viscosity (viscosity when melted), the ratio of the mesogenic epoxy monomer is preferably 35% or more, more preferably 37% or more, and further preferably 40% or more, with respect to the entire epoxy resin.

<Flexural Modulus, Fracture Property and Glass Transition Temperature (Tg) of Cured Product>

A cured product of the epoxy resin according to the present disclosure has a flexural modulus of 3.0 GPa or more at 23° C., a fracture toughness of 1.0 MPa·m$^{1/2}$ or more, and a glass transition temperature of 150° C. or higher. The properties of the cured product will be described below in detail.

The flexural modulus, fracture property and glass transition temperature are values of the cured product obtained by curing an epoxy resin composition containing a curing agent and an epoxy resin at the equivalent ratio of 1:1, using 3,3'-diaminodiphenyl sulfone for the curing agent, under the condition of 180° C. for 4 hours. Here, the equivalent ratio refers to the ratio between the number of equivalents of the functional group of the curing agent (in a case of an amine curing agent, the active hydrogen) contained in the epoxy resin composition and the number of equivalents of the epoxy group of the epoxy resin contained in the epoxy resin composition (number of equivalents of the functional group: number of equivalents of the epoxy group).

[Flexural Modulus]

The cured product of the epoxy resin according to the present disclosure has a flexural modulus of 3.0 GPa or more at 23° C., preferably 3.1 GPa or more, and more preferably 3.2 GPa or more. The upper limit of the flexural modulus is not particularly limited, and may be, for example, 5.0 GPa.

The flexural modulus of a cured product can be measured by a three-point flexural test in accordance with JIS K7171 (2016). Specifically, the flexural modulus can be measured by the method described below in the Examples section.

[Fracture Toughness]

The fracture toughness of the cured product of the epoxy resin according to the present disclosure is 1.0 MPa·m$^{1/2}$ or more, preferably 1.3 MPa·m$^{1/2}$ or more, further preferably 1.5 MPa·m$^{1/2}$ or more, particularly preferably 1.8 MPa·m$^{1/2}$ or more and particularly preferably 2.0 MPa·m$^{1/2}$ or more. The upper limit of the fracture toughness is not particularly limited, and may be, for example, 3.0 MPa·m$^{1/2}$.

The fracture toughness of a cured product can be measured by performing a three-point flexural test in accordance with ASTM D5045. Specifically, the fracture toughness can be measured by the method described below in the Examples section.

[Glass Transition Temperature]

The glass transition temperature of the cured product of the epoxy resin according to the present disclosure is 150° C. or higher, more preferably 155° C. or higher, and further preferably 160° C. or higher. The upper limit of the glass transition temperature is not particularly limited, and may be, for example, 180° C.

The glass transition temperature of a cured product can be measured, for example, as follows. The cured product is cut into a strip shape, and subjected to a dynamic viscoelasticity measurement in a tensile mode under the measurement conditions of a frequency of 10 Hz, a temperature elevation rate of 5° C./min, and a strain of 0.1%. The temperature corresponding to the maximum value of tan δ in a temperature-tan δ chart can be determined as the glass transition temperature. For the evaluation equipment, for example, RSA-G2 (TA Instruments) can be used.

The method for preparing the epoxy resin such that a cured product has a flexural modulus of 3.0 GPa or more at 23° C., a fracture toughness of 1.0 MPa·m$^{1/2}$ or more, and a glass transition temperature of 150° C. or higher is not particularly limited. For example, the flexural modulus, fracture toughness and glass transition temperature can be adjusted by adjusting the types and mixing ratios or the like of the components contained in the epoxy resin.

For example, since an epoxy resin composition containing an epoxy compound having a mesogenic structure can form a higher-order structure when cured, the fracture toughness can be adjusted by adjusting the content of the epoxy compound having a mesogenic structure. Further, the flexural modulus can be adjusted by, for example, increasing the crosslink density in the cured product by adjusting the equivalent weight of the epoxy compound, or reducing the free volume using an epoxy compound having a bulky substituent. Further, in the case of the mesogen-containing epoxy resin, the glass transition temperature can be adjusted by adjusting the epoxy equivalent weight of the epoxy compound.

<Properties of Epoxy Resin>
[Weight Average Molecular Weight]

The weight average molecular weight (Mw) of the epoxy resin is not particularly limited. From the viewpoint of lowering the viscosity, the weight average molecular weight (Mw) of the epoxy resin is preferably from 500 to 3000, more preferably 700 to 2500, and further preferably 800 to 2000.

In the present disclosure, the number average molecular weight (Mn) and the weight average molecular weight (Mw) of the epoxy resin are values measured by liquid chromatography.

The liquid chromatography is performed at a sample concentration of 0.5% by mass and a flow rate of 1.0 ml/min using tetrahydrofuran as a mobile phase. A calibration curve is obtained by using a polystyrene standard sample, based on which polystyrene-equivalent Mn and Mw are measured.

The measurement can be performed by using, for example, a high performance liquid chromatograph L6000 from Hitachi, Ltd. and a data analyzer C-R4A from Shimadzu Corporation. For the column, for example, a GPC column such as G2000HXL or G3000 HXL from Tosoh Corporation can be used.

[Epoxy Equivalent Weight]

The epoxy equivalent weight of the epoxy resin is not particularly limited. From the viewpoint of, for example, flowability of the epoxy resin, thermal conductivity of the cured product, or achieving both favorable fracture toughness and flexural modulus, the epoxy equivalent weight is preferably from 245 g/eq to 500 g/eq, more preferably from 250 g/eq to 450 g/eq, and further preferably from 260 g/eq to 400 g/eq. In the present disclosure, the epoxy equivalent weight of the epoxy resin is measured by perchloric acid titration.

[Viscosity]

The viscosity of the epoxy resin is not particularly limited, and can be determined in accordance with the use of the epoxy resin. From the viewpoint of ease of handling, the viscosity of the epoxy resin at 100° C. is preferably 200 Pa·s or less, more preferably 100 Pa·s or less, and further preferably 20 Pa·s or less.

The viscosity of the epoxy resin at 100° C. can be measured using a rheometer (MCR-301, Anton-Paar GmbH) under the vibrational mode. For example, the measurement can be performed using a parallel plate having a diameter of 12 mm under the conditions of a frequency of 1 kHz, a gap of 0.2 mm and a strain of 2%.

<<Epoxy Resin Composition and Epoxy Resin Cured Product>>

An epoxy resin composition in the present disclosure includes the epoxy resin according to the present disclosure and a curing agent. An epoxy resin cured product in the present disclosure is a cured product of the epoxy resin composition according to the present disclosure.

From the viewpoint of fracture toughness, the epoxy resin composition is preferably capable of forming a smectic structure or nematic structure in the cured product.

<Curing Agent>

The curing agent is not particularly limited as long as it is capable of causing a curing reaction with an epoxy resin. Specific examples of the curing agent include an amine curing agent, a phenol curing agent, an acid anhydride curing agent, a polymercaptan curing agent, a polyaminoamide curing agent, an isocyanate curing agent, and a block isocyanate curing agent. One kind of curing agent may be used singly, or two or more kinds thereof may be used in combination.

From the viewpoint of forming a higher-order structure in a cured product of the epoxy resin composition, the curing agent is preferably an amine curing agent or a phenol curing agent, and more preferably an amine curing agent. The amine curing agent is preferably an amine curing agent having an aromatic ring and an amino group, more preferably an amine curing agent having an aromatic ring with an amino group directly bonded thereto, and further preferably an amine curing agent having an aromatic ring with two or more amino groups directly bonded thereto. Examples of the aromatic ring include a benzene ring and a naphthalene ring.

Specific examples of the amine curing agent include 3,3'-diaminodiphenyl sulfone, 4,4'-diaminodiphenyl sulfone, 4,4'-diaminodiphenylmethane, 4,4'-diaminodiphenyl ether, 4,4'-diamino-3,3'-dimethoxybiphenyl, 4,4'-diaminophenyl benzoate, 1,5-diaminonaphthalene, 1,3-diaminonaphthalene, 1,4-diaminonaphthalene, 1,8-diaminonaphthalene, 1,3-diaminobenzene, 1,4-diaminobenzene, 4,4'-diaminobenzanilide and trimethylene-bis-4-aminobenzoate.

From the viewpoint of forming a smectic structure in a cured product of the epoxy resin composition, the curing agent is preferably 3,3'-diaminodiphenyl sulfone, 4,4'-diaminodiphenyl sulfone, 1,3-diaminobenzene, 1,4-diaminobenzene, 4,4'-diaminobenzanilide, 1,5-diaminonaphthalene, 4,4'-diaminodiphenylmethane or trimethylene-bis-4-aminobenzoate. From the viewpoint of obtaining a cured product with a low moisture absorption and high fracture toughness, 3,3'-diaminodiphenyl sulfone is more preferable.

Examples of the phenol curing agent include a low-molecular phenol compound, and a phenol novolac resin obtained by linking a low-molecular phenol compound with a methylene chain or the like. Examples of the low-molecular phenol compound include a monofunctional phenol compound such as phenol, o-cresol, m-cresol or p-cresol; a bifunctional phenol compound such as catechol, resorcinol or hydroquinone; and a trifunctional phenol compound such as 1,2,3-trihydroxybenzene, 1,2,4-trihydroxybenzene or 1,3,5-trihydroxybenzene.

The content of the curing agent in the epoxy resin composition is not particularly limited. From the viewpoint of efficiency of the curing reaction, the content of the curing agent preferably satisfies a ratio of the number of equivalents of the functional group of the curing agent contained in the epoxy resin composition (in the case of an amine curing agent, the number of equivalents of the active hydrogen) to the number of equivalents of the epoxy group of the epoxy resin contained in the epoxy resin composition (number of equivalents of the functional group/number of equivalents of the epoxy group) of from 0.3 to 3.0, more preferably from 0.5 to 2.0.

<Other Components>

The epoxy resin composition may include components different from the epoxy resin and the curing agent as necessary. For example, the epoxy resin composition may contain a curing catalyst, a filler or the like. Specific examples of the curing catalyst include the compounds described above as a reaction catalyst used for the synthesis of the specific epoxy compound.

[Physical Properties of Epoxy Resin Cured Product]

The epoxy resin cured product in the present disclosure can satisfy the properties of the flexural modulus of 3.0 GPa or more at 23° C., the fracture toughness of 1.0 MPa·m$^{1/2}$ or more, and the glass transition temperature of 150° C. or higher, since it is a cured product of the epoxy resin according to the present disclosure. Details of the flexural modulus, fracture toughness and glass transition temperature are as described above.

[Use of Epoxy Resin Composition and Epoxy Resin Cured Product]

The use of the epoxy resin composition and the epoxy resin cured product is not particularly limited. For example, the epoxy resin composition and the epoxy resin cured product can be suitably used for producing a fiber-reinforced composite material (FRP) used for airplanes or spaceships.

Further, the epoxy resin composition in the present disclosure can be suitably used in a production method of a fiber-reinforced composite material from which a process of localizing thermoplastic resin particles at a surface area of a prepreg is omitted.

<<Composite Material>>

A composite material in the present disclosure includes the epoxy resin cured product according to the present disclosure and a reinforcing material.

<Reinforcing Material>

The material of the reinforcing material included in the composite material is not particularly limited, and may be selected in accordance with, for example, the use of the composite material. Specific examples of the reinforcing material include a carbon material, glass, an aromatic polyamide resin such as Kevlar (registered trade name), ultra-high-molecular-weight polyethylene, alumina, boron nitride, aluminum nitride, mica and silicon. The shape of the reinforcing material is not particularly limited, and examples thereof include fibers and particles (filler). From the viewpoint of the strength of the composite material, the reinforcing material is preferably a carbon material, and more preferably carbon fibers. The composite material may include one kind of reinforcing material singly, or may include two or more kinds thereof in combination.

The form of the composite material is not particularly limited. Examples thereof include a composite material having a structure in which at least one cured product-containing layer that contains the epoxy resin cured product and at least one reinforcing material-containing layer that contains a reinforcing material are layered on one another.

EXAMPLES

Embodiments in the present disclosure will be described in detail below by way of Examples. However, the invention is not limited to these Examples. The units "part" and "%" are based on mass, unless otherwise specified.

Example 1

Synthesis of Epoxy Resin 1

50 parts by mass of 4-{4-(2,3-epoxypropoxy)phenyl}cyclohexyl=4-(2,3-epoxypropoxy)benzoate (a compound represented by the following structural formula (1)) were placed in a 500 mL three-necked flask, to which 26 parts by mass of EX201 (resorsin-type diglycidyl ether, Nagase ChemteX Corporation, Epoxy equivalent weight: 117 g/eq; product name; a compound of Formula (1-c) in which p=0) were added. Further, 80 parts by mass of a synthesis solvent (cyclohexanone) were added to the three-necked flask. A cooling tube and a nitrogen inlet tube were attached to the three-necked flask, and a stirring blade was attached in a manner that it is immersed in the solvent. The three-necked flask was immersed in an oil bath that was set at 120° C., and stirring was started. After confirming that the epoxy compound was dissolved and the solution became transparent, 8 parts by mass of 1,5-dihydroxynaphthalene and 0.5 parts by mass of a reaction catalyst (tetrabutylphosphonium laurate; TBPLA) were added, and the heating was continued in the oil bath at 120° C. After 3 hours of heating, cyclohexanone was evaporated under reduced pressure, and the residue was cooled to room temperature (25° C.), whereby Epoxy Resin 1 was obtained.

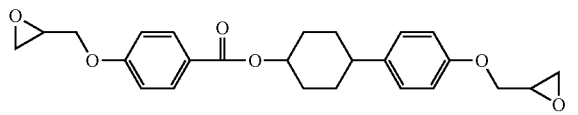

(1)

Subsequently, 84.5 parts by mass of the thus-obtained epoxy resin and 21 parts by mass of 3,3'-diaminodiphenyl sulfone as a curing agent were placed in a stainless dish, and heated to 180° C. on a hot plate. After the epoxy resin composition in the stainless dish was melted, the epoxy resin composition was stirred with a spatula and cooled to room temperature. Next, the epoxy resin composition was heated from ambient temperature to 180° C. at a temperature elevation rate of 2° C./min, and was heated at 180° C. for 4 hours to complete the curing, whereby an epoxy resin cured product was obtained. The epoxy resin cured product was cut into a cuboid having a size of 3.75 mm×7.5 mm×33 mm, whereby a test piece for evaluating fracture toughness was prepared. Further, the epoxy resin cured product was cut into a strip shape having a size of 2 mm×5 mm×50 mm, whereby a test piece for evaluating flexural modulus was prepared.

As a result of the evaluation of flexural modulus, fracture toughness and glass transition temperature by the method described below, the flexural modulus at 23° C. was 3.2 GPa, the fracture toughness was 1.4 MPa·m$^{1/2}$, and the glass transition temperature was 161° C.

Example 2

Synthesis of Epoxy Resin 2

Epoxy Resin 2 was obtained in the same manner as in Example 1 except that the 26 parts by mass of EX201 were replaced with 31 parts by mass of HP4032D (DIC Corporation; a compound of Formula (1-e) in which q=0), which are an epoxy compound having a naphthalene structure, and that the 8 parts by mass of 1,5-dihydroxynaphthalene were replaced with 8 parts by mass of 4,4-biphenol.

Further, an epoxy resin cured product was obtained and respective test pieces were prepared in the same manner as in Example 1 except that 22 parts by mass of 3,3'-diaminodiphenyl sulfone were used with respect to 89 parts by mass of the obtained epoxy resin.

As a result of the evaluation of flexural modulus, fracture toughness and glass transition temperature by the method described below, the flexural modulus at 23° C. was 3.0 GPa, the fracture toughness was 1.2 MPa·m$^{1/2}$, and the glass transition temperature was 173° C.

Example 3

Synthesis of Epoxy Resin 3

Epoxy Resin 3 was obtained in the same manner as in Example 1 except that the 26 parts by mass of EX201 were not used, that the amount of 1,5-dihydroxynaphthalene was reduced to 4 parts by mass, and that the 0.5 parts by mass of tetrabutylphosphonium laurate (TBPLA) was replaced with 0.5 parts by mass of 1,4-benzoquinone derivative of tri-n-butylphosphine (TBP2).

Further, an epoxy resin cured product was obtained and respective test pieces were prepared in the same manner as in Example 1 except that 7 parts by mass of 3,3'-diaminodiphenyl sulfone were used with respect to 54.5 parts by mass of the obtained epoxy resin.

As a result of the evaluation of flexural modulus, fracture toughness and glass transition temperature by the method described below, the flexural modulus at 23° C. was 3.0 GPa, the fracture toughness was 1.9 MPa·m$^{1/2}$, and the glass transition temperature was 160° C.

Comparative Example 1

Synthesis of Epoxy Resin 4

Epoxy Resin 4 was obtained in the same manner as in Example 1 except that the 26 parts by mass of EX201 were not used, that the 8 parts by mass of 1,5-dihydroxynaphthalene were replaced with 5 parts by mass of 4,4-biphenol.

Further, an epoxy resin cured product was obtained and respective test pieces were prepared in the same manner as in Example 1 except that 10 parts by mass of 3,3'-diaminodiphenyl sulfone were used with respect to 55.5 parts by mass of the obtained epoxy resin.

As a result of the evaluation of flexural modulus, fracture toughness and glass transition temperature by the method described below, the flexural modulus at 23° C. was 2.7 GPa, the fracture toughness was 2.0 MPa·m$^{1/2}$, and the glass transition temperature was 155° C.

Comparative Example 2

An epoxy resin cured product was obtained and respective test pieces were prepared in the same manner as in Example 1 except that 40 parts by mass of 3,3'-diaminodiphenyl sulfone as a curing agent were used with respect to 50 parts by mass of YH434 (tetraglycidyl diaminodiphenylmethane, Nippon Steel & Chemical Co., Ltd.) and 50 parts by mass of jER825 (bisphenol A epoxy resin, Mitsubishi Chemical Corporation).

As a result of the evaluation of flexural modulus, fracture toughness and glass transition temperature by the method described below, the flexural modulus at 23° C. was 3.9 GPa, the fracture toughness was 0.7 MPa·m$^{1/2}$, and the glass transition temperature was 175° C.

The method for evaluating the flexural modulus, fracture toughness and glass transition temperature will be described below.

[Measurement of Fracture Toughness]

Fracture toughness values (MPa·m$^{1/2}$) were used as an index of the fracture toughness of the epoxy resin cured products. The fracture toughness values of the test pieces were calculated by performing a three-point flexural test in accordance with ASTM D5045. For the evaluation equipment, Instron 5948 (Instron) was used.

[Measurement of Glass Transition Temperature]

The glass transition temperatures (Tg) were used as an index of thermal resistance of the epoxy resin cured products. The glass transition temperatures of the test pieces were calculated by performing a dynamic viscoelasticity measurement in a tensile mode under the measurement conditions of a frequency of 10 Hz, a temperature elevation rate of 5° C./min, and a strain of 0.1%. The temperature corresponding to the maximum value of tan δ in a temperature-tan δ chart was determined as the glass transition temperature. For the evaluation equipment, RSA-G2 (TA Instruments) was used.

[Measurement of Flexural Modulus]

The flexural modulus (GPa) at 23° C. was measured as an index of elasticity of the epoxy resin cured products. The flexural modulus of the test pieces was calculated by performing a three-point flexural test in accordance with JIS K7171(2016). For the evaluation equipment, Tensilon (A & D Company, Limited) was used.

The cured products obtained by using Epoxy Resins 1 to 3 synthesized in Examples 1 to 3 have a flexural modulus of 3.0 GPa or more at 23° C., a fracture toughness of 1.0 MPa·m$^{1/2}$ or more, and a glass transition temperature of 150° C. or higher. It is thought that such epoxy resins can be suitably applied to the production of fiber-reinforced composite materials from which a process such as localizing thermoplastic resin particles at a surface area of a prepreg is omitted.

On the other hand, in a case in which the above physical properties are not satisfied, it is difficult to simplify of the production processes of fiber-reinforced composite materials. For example, as in the epoxy resin of Comparative Example 2, if an epoxy resin, the cured product of which has a flexural modulus of 3.0 GPa or more and a fracture toughness of less than 1.0 MPa·m$^{1/2}$, is used, the production processes of fiber-reinforced composite materials for airplanes cannot be simplified since the fracture toughness needs to be improved by, for example, providing a layer in which thermoplastic resin particles are dispersed. Further, as in the epoxy resin of Comparative Example 1, an epoxy resin, the cured product of which has a fracture toughness of 1.0 MPa·m$^{1/2}$ or more and a flexural modulus of less than 3.0 GPa, can hardly be an alternative material to a resin that can simplify the production processes in view of the flexural modulus.

All the documents, patent applications and technical standards that are described in the present specification are hereby incorporated by reference to the same extent as if each individual document, patent application or technical standard is concretely and individually described to be incorporated by reference.

The invention claimed is:

1. An epoxy resin, comprising an epoxy compound having a mesogenic structure, a cured product of the epoxy resin having a flexural modulus of 3.0 GPa or more at 23° C., a fracture toughness of 1.0 MPa·m$^{1/2}$ or more, and a glass transition temperature of 150° ° C. or higher,
wherein the epoxy compound having a mesogenic structure comprises a compound that has a structure in which at least two mesogenic structures are linked via a divalent aromatic group, the divalent aromatic group being a naphthylene group.

2. The epoxy resin according to claim 1, wherein the mesogenic structure includes a mesogenic structure represented by the following General Formula (1):

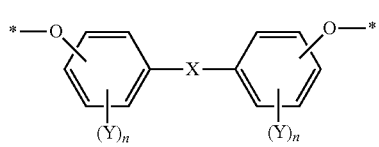

(1)

wherein, in General Formula (1), X represents a single bond or a linking group that includes at least one divalent group selected from the following Group (A); each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; and * represents a bonding site to an adjacent atom:

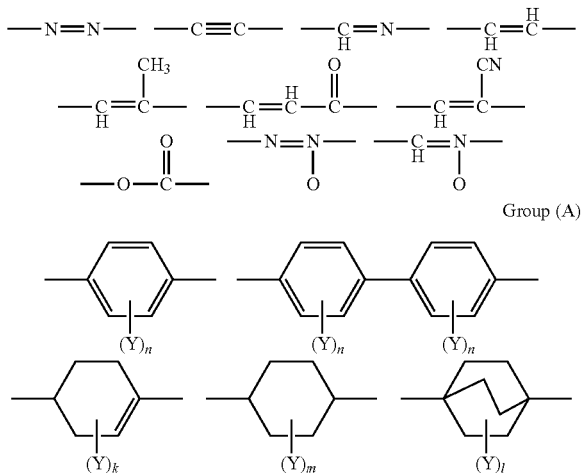

Group (A)

wherein, in Group (A), each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; k represents an integer from 0 to 7; m represents an integer from 0 to 8; and l represents an integer from 0 to 12.

3. The epoxy resin according to claim 2, wherein the structure represented by General Formula (1) includes a structure represented by the following General Formula (2)

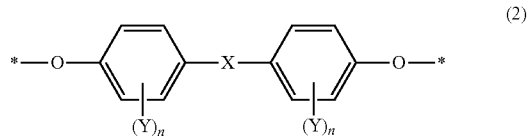

(2)

wherein, in General Formula (2), X represents a single bond or a linking group that includes at least one divalent group selected from Group (A); each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; and * represents a bonding site to an adjacent atom.

4. The epoxy resin according to claim 2, wherein the epoxy compound having a mesogenic structure includes at least one structure selected from the group consisting of the following General Formula (1-A), General Formula (1-B), and General Formula (1-C):

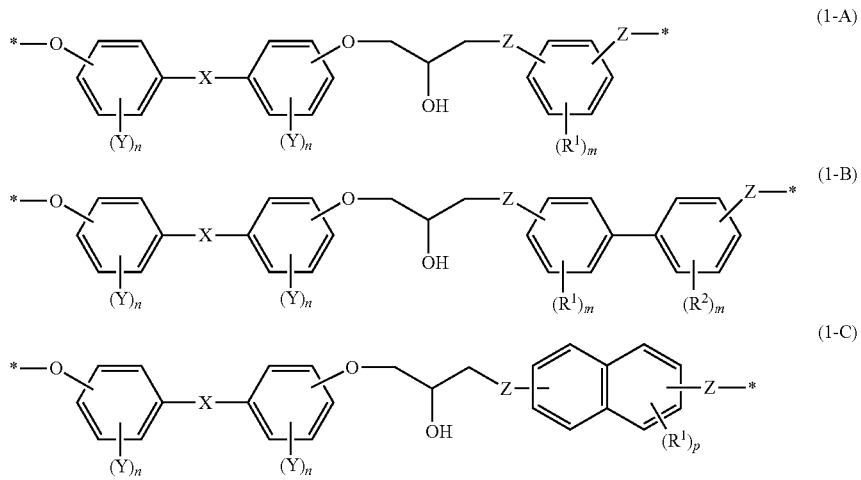

(1-A)
(1-B)
(1-C)

wherein, in General Formula (1-A), General Formula (1-B), and General Formula (1-C), X represents a single bond or a linking group that includes at least one divalent group selected from Group (A); each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; each m independently represents an integer from 0 to 4; p represents an integer from 0 to 6; each Z independently represents —O— or —NH—; each of $R^1$ and $R^2$ independently represents an alkyl group having 1 to 8 carbon atoms; and * represents a bonding site to an adjacent atom.

5. The epoxy resin according to claim 2, wherein the epoxy compound having a mesogenic structure includes at least one structure selected from the group consisting of the following General Formula (2-A), General Formula (2-B), and General Formula (2-C):

wherein, in General Formula (2-A), General Formula (2-B), and General Formula (2-C), X represents a single bond or a linking group that includes at least one divalent group selected from Group (A); each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; each m independently represents an integer from 0 to 4; p represents an integer from 0 to 6; each Z independently represents —O— or —NH—; each of $R^1$ and $R^2$ independently represents an alkyl group having 1 to 8 carbon atoms; and * represents a bonding site to an adjacent atom.

6. The epoxy resin according to claim 3, wherein the structure represented by General Formula (2) includes at least one structure selected from the group consisting of the following General Formula (3) and General Formula (4):

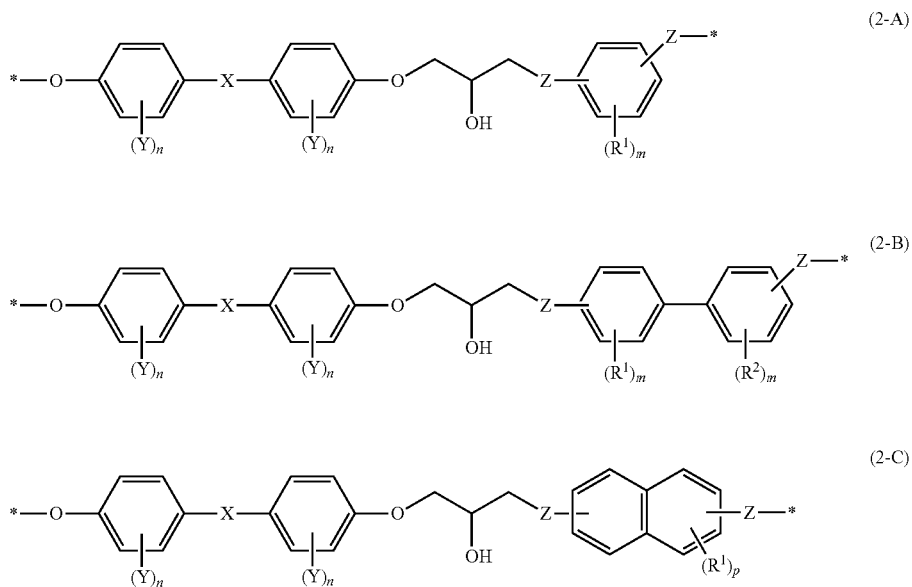

(2-A)
(2-B)
(2-C)

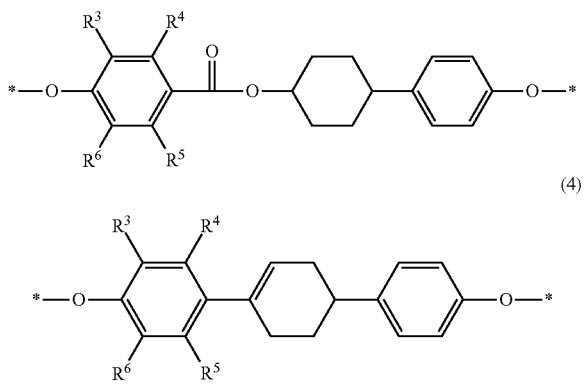

wherein, in General Formula (3) and (4), each of $R^3$ to $R^6$ independently represents a hydrogen atom or an alkyl group having 1 to 3 carbon atoms; and * represents a bonding site to an adjacent atom.

7. An epoxy resin composition, comprising the epoxy resin according to claim 1 and a curing agent.

8. The epoxy resin composition according to claim 7, wherein the curing agent includes a compound having two or more amino groups that are directly bonded to an aromatic ring.

9. The epoxy resin composition according to claim 7, wherein the curing agent includes 3,3'-diaminodiphenyl sulfone.

10. An epoxy resin cured product, comprising a cured product of the epoxy resin composition according to claim 7.

11. A composite material, comprising the epoxy resin cured product according to claim 10 and a reinforcing material.

12. The composite material according to claim 11, wherein the reinforcing material includes a carbon material.

* * * * *